April 7, 1942.  A. D. SINDEN  2,279,070
CONVEYER
Filed Aug. 12, 1939
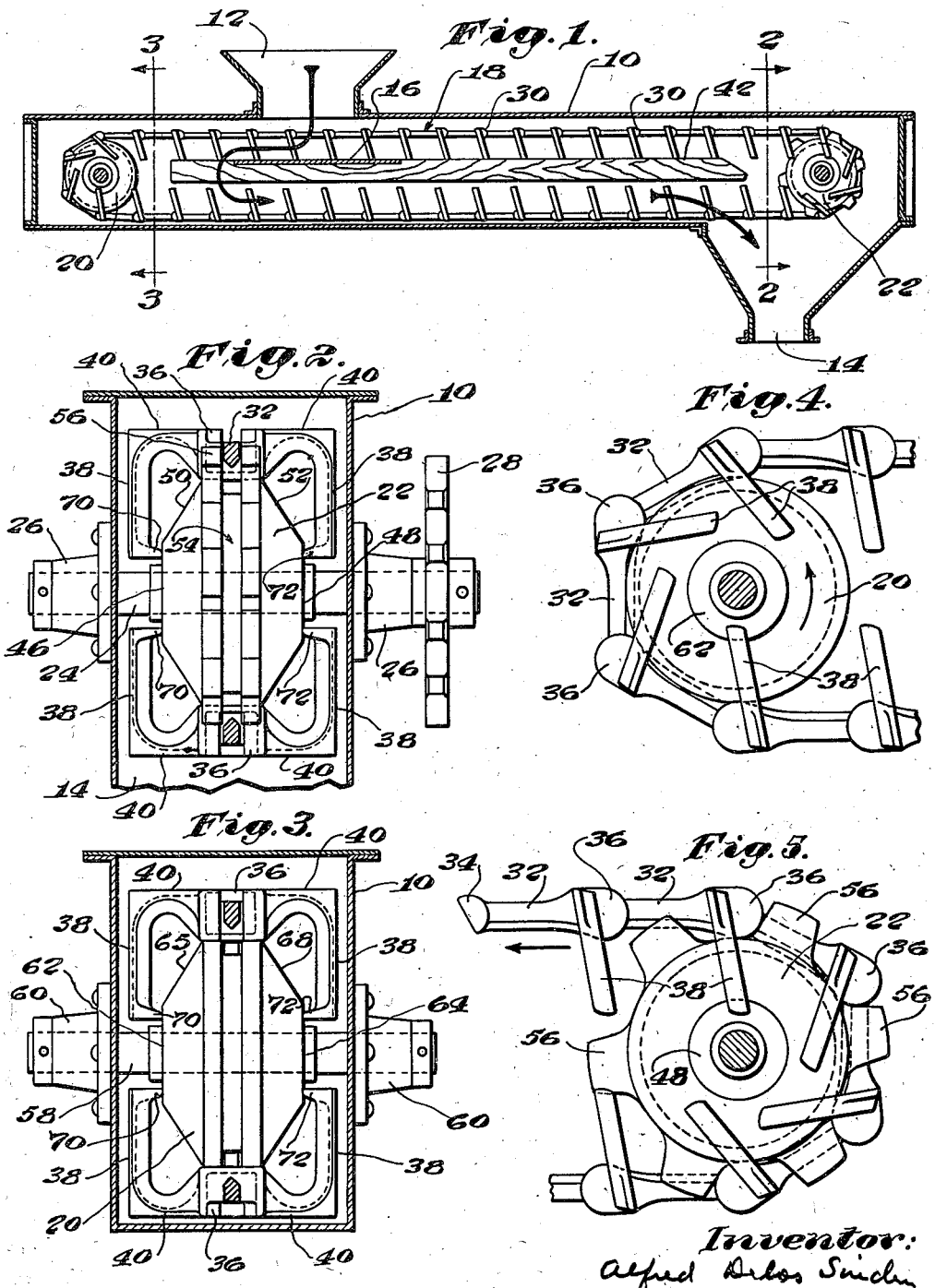
Inventor:
Alfred Delos Sinden
by J. Stanley Churchill
Atty.

Patented Apr. 7, 1942

2,279,070

UNITED STATES PATENT OFFICE 2,279,070

CONVEYER

Alfred Delos Sinden, Aurora, Ill., assignor to Redler Conveyor Company, Quincy, Mass., a corporation of Massachusetts Application August 12, 1939, Serial No. 289,903

4 Claims. (Cl. 198—168)

This invention relates to a conveyer for conveying solid flowable material.

The invention has for an object to provide a novel and improved conveyer of the character in which an endless conveying element comprising a plurality of spaced flight members is arranged to be drawn through a casing or conduit to effect the conveyance of the material therethrough and in which the conveying element is arranged to pass over a novel rotary element disposed at either one or both ends of the conduit having provision for guiding and aligning the conveying element in a manner such as to enable the conveyer to be operated in a smooth uninterrupted and efficient manner.

With this general object in view and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a longitudinal sectional view of a conveyer embodying the present invention; Fig. 2 is a cross-sectional detail on the line 2—2 of Fig. 1; Fig. 3 is a similar view on the line 3—3 of Fig. 1; Fig. 4 is an enlarged detail view showing the conveying element passing over the idler wheel; and Fig. 5 is a similar view showing the conveying element passing over the driving wheel.

In the preferred embodiment of the invention the conveying element may and preferably will comprise a plurality of individual flights of open construction and of general U-shape, pivotally and detachably connected together and which are disposed transversely of the direction of movement of the conveying element through the conduit. In the commercial operation of a conveyer employing a conveying element of this type, it is desirable for most efficient conveying performance to maintain the conveying element in a substantially central position with respect to the walls of the casing through which it is drawn. In operation, the open flights are buried in the material being conveyed and are preferably disposed in floating relation thereto in order to move the material along in a continuous stream. Prior to the present invention, it was found in practice, that a tendency existed for the flight members to run out of line and rub against the side walls of the casing causing excessive friction and wear of the casing and the conveying element. Also, in some instances, the flight members, at times, became tilted with relation to the casing so that the legs of the U-shaped flights would catch on the rotary element over which they passed.

In accordance with the present invention, these objectional features are eliminated by providing one or more rotary elements over which the conveying element passes having provision for engaging the extended portions of successive U-shaped flights and for cooperating therewith to guide and align the conveying element with respect to the casing as the flights pass thereover.

Referring now to the drawing, the different features of the invention have, for purposes of illustration, been shown as embodied in a conveyer of the general type illustrated in the United States Patent to Sinden, No. 2,154,707, April 18, 1939, and in which 10 represents the casing or conduit which is provided with an inlet 12 and an outlet 14. The flowable solid material is introduced into the conduit through the inlet 12 and in the conventional form of conveyer illustrated in Fig. 1, the flowable solid material is conveyed to the left through the upper run of the conduit and over a deflecting or supporting plate 16 by an endless conveying element indicated generally by the numeral 18 which is arranged to run over rotary elements comprising an idler wheel 20 and a driving wheel or sprocket 22 disposed at opposite ends of the conveyer. As illustrated in Fig. 2, the sprocket 22 is mounted upon a shaft 24 journalled in suitable bearings 26 attached to the conduit 10, and the shaft 24 may be rotated from any convenient source of power, not shown, through connections to a sprocket 28 also fast on the shaft 24. In the conveyer illustrated herein, the material is permitted to fall by gravity from the plate 16 onto the bottom wall of the casing 10 where it is conveyed to the outlet 14 by the lower run of the conveyer, but it will be understood that the invention may be embodied in conveyers of different form.

In the illustrated embodiment of the invention, the conveying element 18 is provided with a plurality of pivotally and detachably connected flight members 30 of open construction and of general U-shape, which are disposed transversely of the conduit in order to effect the conveyance of material therethrough. As herein shown, each U-shaped flight member 30 is provided with a tension link 32 formed integrally therewith and the conveying members are assembled by hooking a connecting lug 34 of one member into the barrel 36 of a preceding flight. As clearly shown in Figs. 2 and 3, the legs 38 of each U-shaped flight are connected to the barrel or hub portion 36 by laterally extended portions 40. In the operation of the conveyer, when the conveying element reaches the upper run, the flights are in an inverted position, and the ends of the legs 38 are in contact with supporting runners 42. In practice, the legs 38 of the flights are preferably inclined rearwardly with respect to the general direction of movement of the conveying element, as shown.

In accordance with the present invention, provision is made for guiding and aligning the conveying element with respect to the side walls of the casing, as the conveying element passes over the wheels 20, 22 at the ends of the conveyer. As herein shown, see Figs. 2 and 5, the driving wheel or sprocket 22 comprises a solid drum having a relatively wide hub or central portion forming parallel faces 46, 48 and having tapered sides 50, 52 extending from the hub portion to the periphery of the wheel thereby forming opposed inclined faces upon either side thereof. As herein shown, the periphery of the wheel is provided with a groove 54 in order to provide a clearance for the connecting links 32 as they pass around the wheel forming in effect a double sprocket having teeth 56 arranged to engage opposed portions of the barrel 36 of each flight to drive the conveying element.

As illustrated in Figs. 3 and 4, the idler wheel 20, which is mounted upon a shaft 58 journalled in suitable bearings 60, comprises a solid drum provided with similar parallel faces 62, 64 and inclined surfaces 65, 68, and having a centrally grooved portion arranged to engage opposed portions of the barrel 36 of each flight member as the conveying element passes thereover.

From the above description, it will be observed that in the operation of the conveyer as the inverted flights start to pass over the tail end or idler wheel 20 from the upper to the lower run of the conveyer, see Fig. 4, the ends of the legs 38 which are herein shown are provided with inwardly extended portions 70, 72, engage the inclined surfaces of the wheel, and during the continued movement of the conveying element around the wheel 20, the legs are gradually guided and urged toward a central position in which they bear against the parallel faces 62, 64 of the wheel. Thus, when the conveying element leaves the idler wheel 20 and passes into the lower run of the conveyer it is aligned in a central position with respect to the side walls of the casing 10. Should a flight arrive at the tail end of the conveyer in a tilted position, the engagement of the ends 70, 72 of the legs 38 with the inclined faces will operate to guide the flight into a horizontal position and in alignment.

In a similar manner, as illustrated in Fig. 5, when the upright flights start to pass around the driving sprocket 22 from the lower to the upper run of the conveyer, the inwardly extended portions 70, 72 of the legs 38 engage the inclined surfaces 50, 52 and are gradually urged into alignment against the parallel faces 46, 48.

Although in the illustrated embodiment of the invention, two rotary elements are shown for guiding and aligning the conveying element as it passes thereover, the invention may also be embodied in a conveyer or elevator wherein but one rotary element is required.

While the preferred embodiment of the invention has been herein illustrated and described, it will be understood that the invention may be embodied in other forms within the scope of the following claims.

Having thus described the invention, what is claimed is:

1. In a conveyer of the character described, in combination, a casing, an endless conveying element traversable therethrough comprising a plurality of pivotally connected spaced flights of open construction, and a rotary member having opposed conical surfaces arranged to taper outwardly from the periphery thereof and over which said conveying element passes, said flights being adapted to cooperate with said conical surfaces to be moved into alignment with the side walls of the casing.

2. In a conveyer of the character described, in combination, a casing, an endless conveying element traversable through the casing and comprising a plurality of connected spaced flights of open construction, and a rotary member disposed intermediate the side walls of said casing and over which said conveying element passes, said rotary member having opposed conical surfaces adapted to cooperate with the legs of said flights for guiding and aligning said conveying element with relation to the side walls of said casing as the conveying element passes over said rotary member.

3. In a conveyer of the character described, in combination, a casing, and endless conveying element comprising a plurality of connected spaced flights of open construction and of general U-shape, and a rotary member disposed within and intermediate the side walls of said casing and over which said conveying element passes, said rotary member being provided with opposed parallel surfaces comprising the hub thereof and with opposed inclined surfaces extending from said hub to the periphery of the rotary member, said surfaces being adapted to cooperate with the legs of said U-shaped flights as the conveying element passes over said rotary member whereby to guide and align said conveying element with respect to the side walls of said casing.

4. In a conveyer of the character described, in combination, a casing having upper and lower runs, an endless conveying element comprising a plurality of detachably connected U-shaped flights traversable through the casing, and a pair of rotary members disposed within and intermediate the side walls of said casing and over which said conveying element passes when traveling from one run to another, each of said rotary members being provided with opposed parallel surfaces comprising the hub thereof and opposed conical surfaces extending from said hub to the periphery of said rotary members, said surfaces being adapted to cooperate with the legs of said U-shaped flights as the conveying element passes from one run to another whereby to guide and align said conveying element with relation to the side walls of said casing.

ALFRED DELOS SINDEN.